US009385829B2

(12) United States Patent
McColloch et al.

(10) Patent No.: US 9,385,829 B2
(45) Date of Patent: Jul. 5, 2016

(54) OPTICAL TRANSCEIVER HAVING OPTICS WITH ROTATED OPTICAL PATH

(71) Applicant: Avago Technologies General IP (Singapore) Pte. Ltd., Singapore (SG)

(72) Inventors: Laurence R. McColloch, Santa Clara, CA (US); Omid Momtahan, Palo Alto, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 14/526,320

(22) Filed: Oct. 28, 2014

(65) Prior Publication Data

US 2016/0119074 A1    Apr. 28, 2016

(51) Int. Cl.
*H04B 10/40* (2013.01)
*H04J 14/02* (2006.01)

(52) U.S. Cl.
CPC ............... *H04J 14/02* (2013.01); *H04B 10/40* (2013.01)

(58) Field of Classification Search
CPC .. H04B 10/40; H04B 10/43; G02B 6/42–6/43
See application file for complete search history.

(56) References Cited

U.S. PATENT DOCUMENTS

| | | | | |
|---|---|---|---|---|
| 4,701,012 A | * | 10/1987 | Kaiser | G02B 6/122 385/24 |
| 5,521,733 A | * | 5/1996 | Akiyama | G02B 6/29362 398/48 |
| 6,075,632 A | * | 6/2000 | Braun | H04B 10/07953 359/634 |
| 6,198,864 B1 | | 3/2001 | Lemoff et al. | |
| 8,315,492 B2 | * | 11/2012 | Chen | G02B 6/4214 385/33 |
| 2001/0033707 A1 | * | 10/2001 | Patel | G02B 6/29328 385/16 |
| 2005/0147353 A1 | * | 7/2005 | Vancoill | G02B 6/4204 385/47 |
| 2011/0097037 A1 | * | 4/2011 | Kuznia | G02B 6/4214 385/33 |
| 2011/0229093 A1 | * | 9/2011 | McColloch | G02B 6/4246 385/92 |
| 2012/0002284 A1 | * | 1/2012 | McColloch | G02B 6/4206 359/558 |
| 2012/0018616 A1 | * | 1/2012 | Smith | G01D 5/30 250/208.1 |
| 2013/0148969 A1 | * | 6/2013 | Sheu | H04B 10/40 398/79 |
| 2013/0230278 A1 | | 9/2013 | Hung et al. | |

FOREIGN PATENT DOCUMENTS

CN    103744145 A    4/2014

OTHER PUBLICATIONS

Lemoff, Brian. Coarse WDM Transceivers. OPN Trends, Mar. 2002, pp. S8-S14.
Lee, Hak-Soon, et al. Ribbon plastic optical fiber linked optical transmitter and receiver modules featuring a high alignment tolerance. Optics Express, vol. 19, No. 5, Feb. 18, 2011.

* cited by examiner

*Primary Examiner* — Li Liu (57) ABSTRACT

An optical communications module includes first and second opto-electronic devices and an optics device, in which a common beam path axis is oriented in a rotated direction about the axis at which a fiber is coupleable to the optics device barrel. The optics device includes a TIR lens aligned with the barrel axis. The TIR lens reflects optical signals between the barrel axis and a common beam path axis oriented in a direction having X-axis and Y-axis components offset by non-zero amounts from the barrel axis. The common beam path axis intersects first and second reflective interfaces of the device. The first opto-electronic device is aligned along a first beam path axis that intersects the first reflective interface and the common beam path axis. The second opto-electronic device is aligned along a second beam path axis that intersects the second reflective interface and the common beam path.

22 Claims, 10 Drawing Sheets

OPTICAL TRANSCEIVER HAVING OPTICS WITH ROTATED OPTICAL PATH

BACKGROUND

Optical data transceiver modules convert optical signals received via an optical fiber into electrical signals, and convert electrical signals into optical signals for transmission via an optical fiber. In the transmitter portion of a transceiver module, an opto-electronic light source such as a laser performs the electrical-to-optical signal conversion. In the receiver portion of the transceiver module, an opto-electronic light detector such as a photodiode performs the optical-to-electrical signal conversion. A transceiver module commonly also includes optical elements or optics, such as lenses, as well as electrical circuitry such as drivers and receivers. A transceiver module also includes one or more connector receptacles to which an optical fiber cable can be connected. The light source, light detector, optical elements and electrical circuitry can be mounted within a module housing. Various transceiver module configurations are known.

A transceiver module can employ wavelength division multiplexing (WDM), such as coarse wavelength division multiplexing (CWDM), to achieve more than one channel over a single fiber. WDM techniques are commonly employed in bidirectional transceiver modules. The opto-electronics of a WDM bidirectional transceiver module commonly include a laser that emits light of a first wavelength and a photodiode that receives light of a second wavelength. The optics of a WDM transceiver module commonly include one or more bandpass filters that are highly transmissive to some wavelengths and highly reflective to other wavelengths. The light beams are thus communicated along paths that include the one or more filters between the end of the fiber and the laser and photodiode. Due to space constraints and mechanical mounting considerations in the module, these elements can be positioned relative to one another in a manner that results in the optical path having a "zigzag" shape. For this reason, such a technique of implementing CWDM in a transceiver module is referred to as a "zigzag."

SUMMARY

Embodiments of the present invention relate to an optical communications module having a housing assembly, a plurality of opto-electronic devices, and an optics device with a common beam path axis oriented in a rotated direction about the axis at which a fiber is coupleable to the barrel of the optics device. In an exemplary embodiment, the barrel has an axis defined by a Z axis of a Cartesian frame of reference having mutually perpendicular X, Y and Z axes. The optics device includes a Total Internal Reflection (TIR) lens aligned with the barrel axis. The TIR lens is configured to reflect optical signals between the barrel axis and a common beam path axis oriented in a direction having X-axis and Y-axis components offset by non-zero amounts from the barrel axis. The common beam path axis intersects first and second reflective interfaces of the optics device. A first one of the opto-electronic devices is optically aligned along a first beam path axis that intersects the first reflective interface and the common beam path axis. A second one of the opto-electronic devices is optically aligned along a second beam path axis that intersects the second reflective interface and the common beam path axis.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
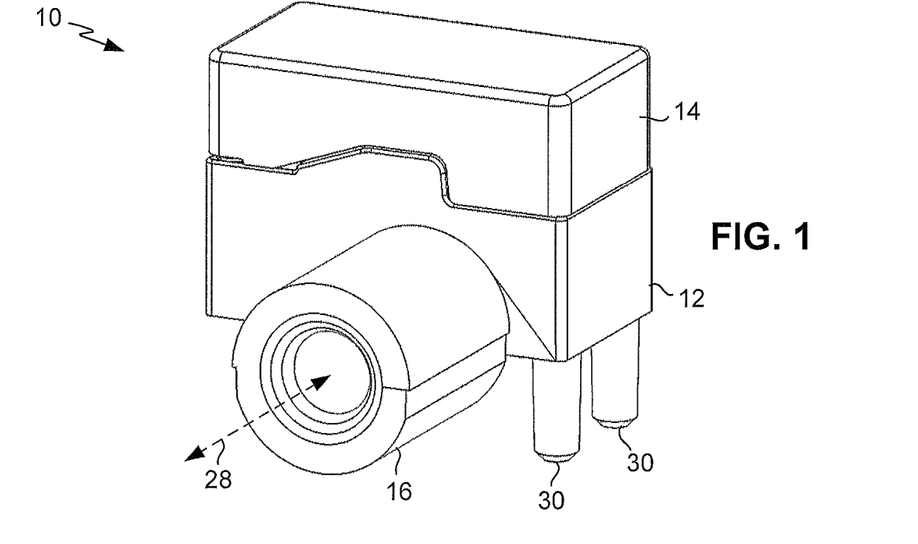
FIG. 1 is a front perspective view of an optics device, in accordance with an exemplary embodiment of the invention.
Figure 2:
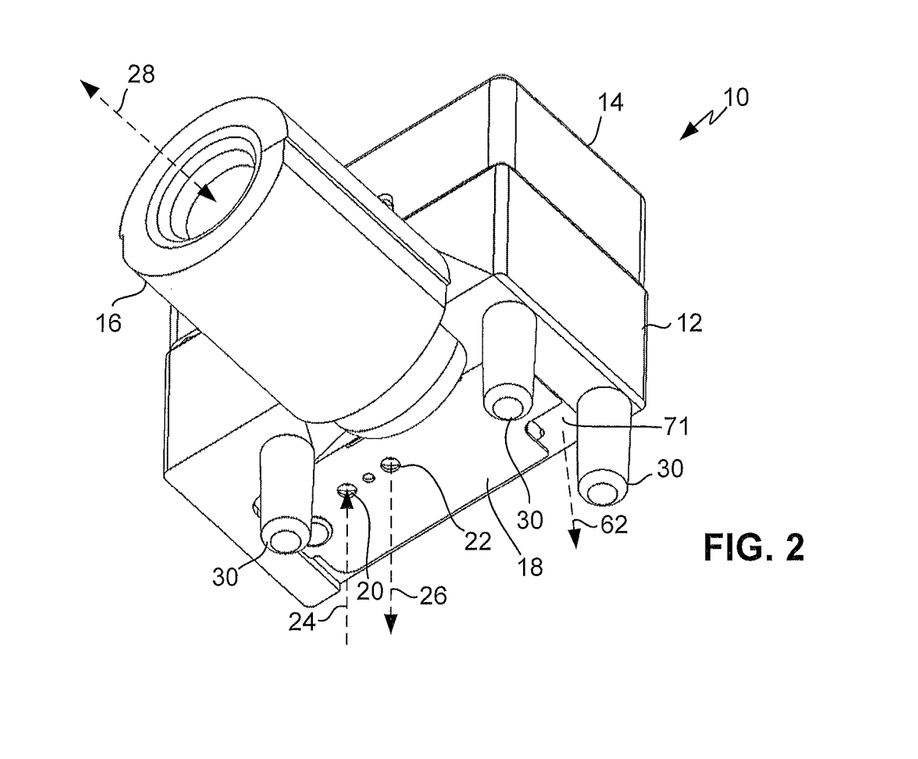
FIG. 2 is a bottom perspective view of the optics device.
Figure 3:
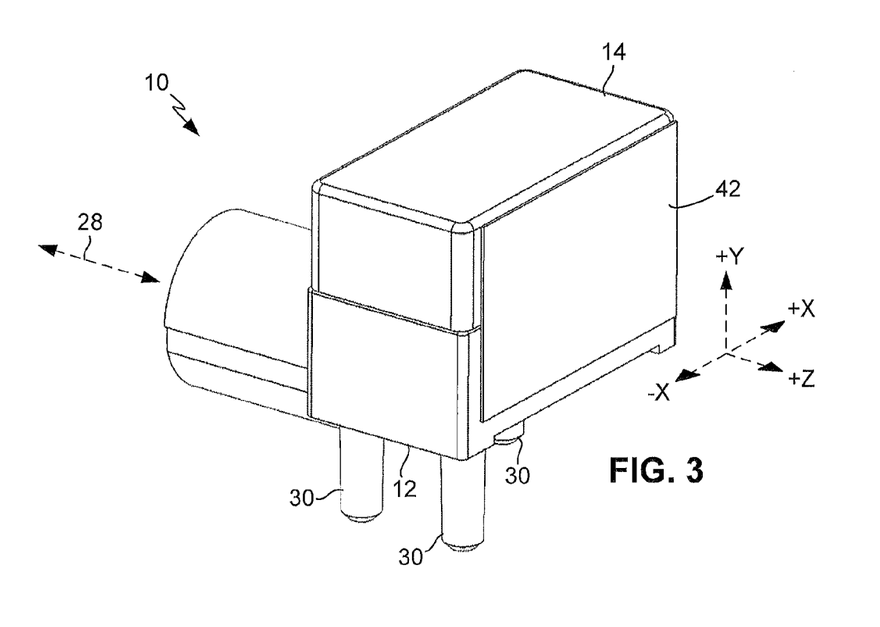
FIG. 3 is a rear perspective view of the optics device.

As illustrated in FIGS. 1-3, in an illustrative or exemplary embodiment of the invention, an optics device 10 includes a body 12 attached to a lid 14. Body 12 has a generally cylindrical barrel 16. Body 12 can consist of molded optical-grade plastic that is transparent to both a transmit wavelength and a receive wavelength. Examples of suitable plastics include most optical grade plastics, such as polycarbonate, acrylic, or olefin.

A baffle 18 (FIG. 2) is attached to the bottom of body 12. Baffle 18 can be a thin sheet of metal having apertures 20 and 22. When optics device 10 is in operation in the manner described below, optical beams are communicated along a first beam path axis 24 and a second beam path axis 26 aligned with apertures 20 and 22, respectively. During such operation, optical signals can be communicated along a barrel optical axis 28. Posts 30 that extend from the lower portion of body 12 can facilitate mounting optics device 10 in the manner described below.

Figure 4:
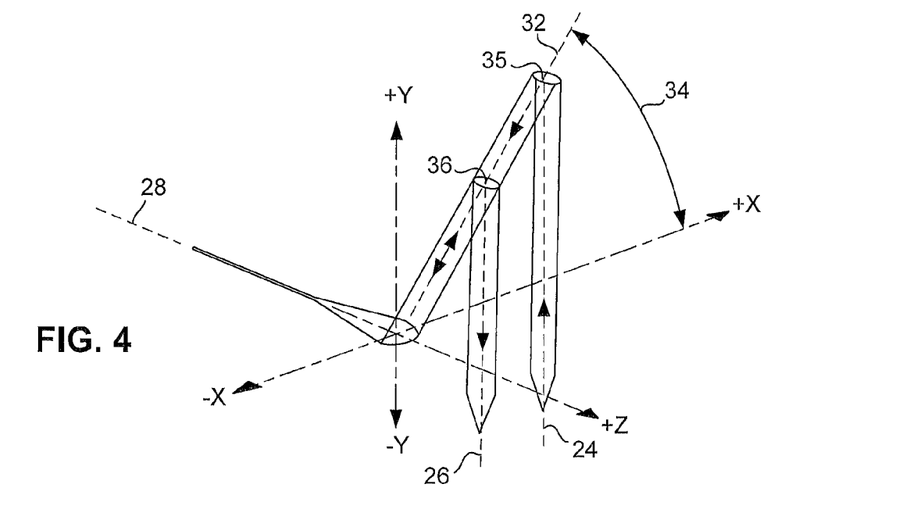
FIG. 4 is a diagram illustrating relative orientations of optical beam path axes of the optics device.
Figure 5:
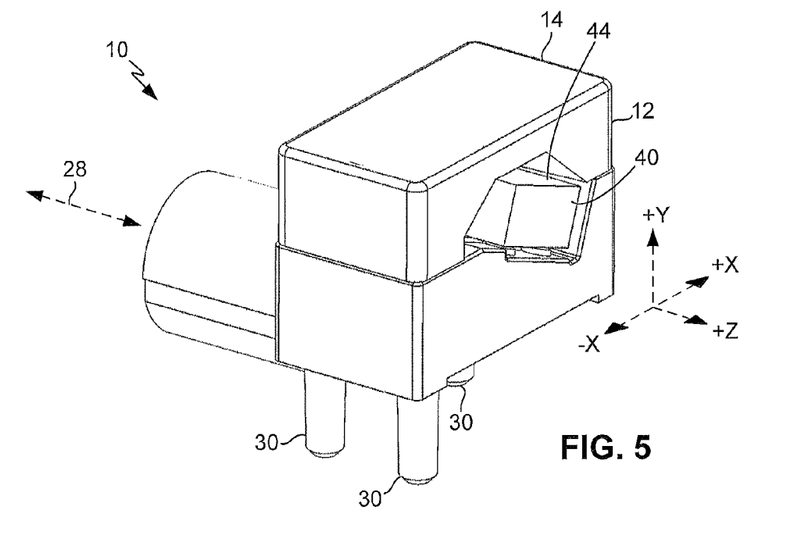
FIG. 5 is similar to FIG. 3, but with a rear cover removed to reveal the interior of the optics device.
Figure 6:
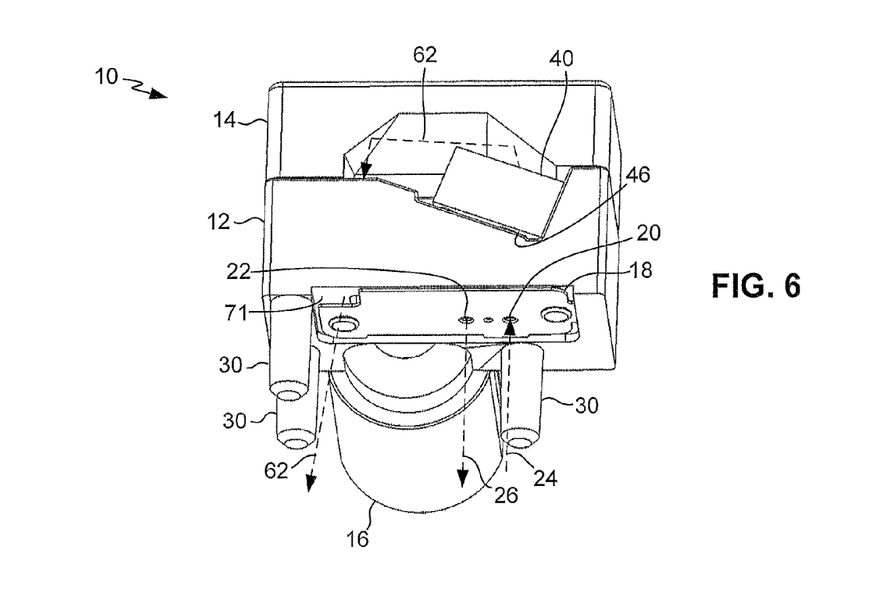
FIG. 6 is a bottom perspective view of the optics device, with the rear cover removed to reveal the interior.

As illustrated in FIG. 4, relationships among optical elements of optics device 10 and the operation of optics device 10 can be described with reference to an exemplary three-dimensional Cartesian coordinate system or frame of reference having X, Y and Z coordinates or dimensions. That is, the frame of reference has X, Y and Z axes that are mutually perpendicular to one another. The Z axis is aligned with the above-described barrel optical axis 28. A common beam path axis 32 is oriented in a direction having an X-axis component offset by a non-zero amount from barrel optical axis 28 and a Y-axis component offset by a non-zero amount from barrel optical axis 28. That is, in this exemplary reference system points on common beam path axis 32 have positive X and Y coordinates. Stated yet another way, common beam path axis 32 is rotated about the Z axis at a non-zero angle 34 with respect to the X axis. Angle 34 can be between zero and 90 degrees and, in the exemplary embodiment, is approximately 45 degrees.

It can also be noted that in the exemplary embodiment the intersection of common beam path axis 32 and barrel optical axis 28 is at coordinates {0,0,0} and that common beam path axis 32 lies in the X-Y plane. First beam path axis 24 intersects common beam path axis 32 at an intersection 35. Similarly, second beam path axis 26 intersects common beam path axis 32 at another intersection 36. In the exemplary embodiment first beam path axis 24 and second beam path axis 26 are parallel to each other and lie in the X-Y plane. It should be understood that for purposes of clarity the foregoing descriptions omit consideration of beam width of optical beams. One of ordinary skill in the art can appreciate that optical beams are subject to spreading and other effects, as conceptually indicated in solid line around portions of axes 24, 26, 28, 32.

As illustrated in FIGS. 5-8, a filter block 40 is disposed in a cavity inside optics device 10. A cover 42 (FIG. 3), which can be a film or sheet of thin plastic adhered to the rear wall of optics device 10, seals the cavity and protects optical elements within the cavity against contamination by foreign matter, such as dust and moisture, which could adversely affect the optical qualities of such elements.

In an exemplary embodiment, filter block 40 is block-shaped, i.e., six-sided and rectangular, and made of glass. An upper surface 44 (FIG. 5) of filter block 40 is silvered with a coating that provides an at least partially reflective interface at a first wavelength (though the reflectivity need not be wavelength-dependent). The reflective interface defined by upper surface 44 can have a selected amount of reflectivity at the first wavelength. A lower surface 46 (FIG. 6) of filter block 40 similarly has a coating that provides a reflective interface at a second wavelength. The reflective interface defined by lower surface 46 is substantially reflective at the second wavelength. As used herein, the term "substantially" means greater than about 80 percent. Lower surface 46 is also substantially transmissive at the first wavelength. Lower surface 46 thus serves as a bandpass or notch filter that passes the first wavelength and reflects the second wavelength.

Lower surface 46 directly contacts three landings or pads 45 (FIG. 8) on an upper portion of body 12 to provide a kinematic mount for filter block 40. Optically transparent epoxy 47 (FIG. 8) in the spaces between lower surface 46 and the adjacent surfaces of body 12 adheres filter block 40 to body 12.

Figure 7:
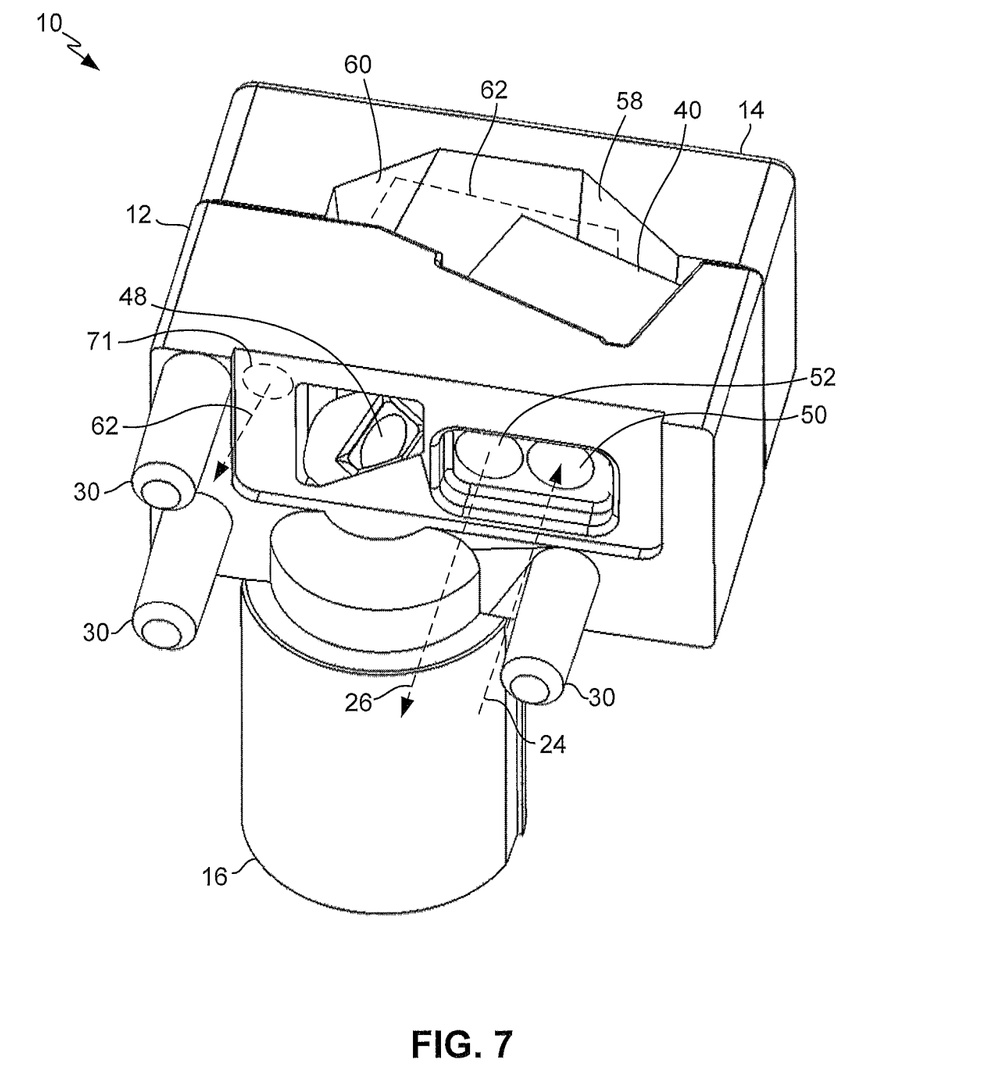
FIG. 7 is similar to FIG. 6, but with a bottom baffle removed to reveal the lenses of the optics device.

As illustrated in FIG. 7, the lower portion of body 12 includes a total internal reflection (TIR) lens 48 that is configured to provide the above-described beam rotation as well as a collimating effect. Note that TIR lens 48 does not rely upon an air gap for its optical effect. Rather, TIR lens 48 is part of the same continuous, homogeneous region of optically transparent material of which the remainder of body 12 consists. Such a region of material may be referred to herein for convenience as a "solid block" of the material. To provide the rotating and collimating effects described herein, TIR lens 48 can have an irregular shape, such as, for example, an irregular biconic shape.

The lower portion of body 12 also includes a first lens 50 and a second lens 52, both of which are configured to provide a focusing effect. First and second lenses 50 and 52 can each have a convex shape. As body 12 consists of a solid block of material in the exemplary embodiment, lenses 48, 50 and 52 are co-formed in the solid block of material along with all other features of body 12. Thus, lenses 48, 50 and 52 are defined by convex regions of a surface of body 12. Lenses 48, 50 and 52 are slightly recessed in body 12 below the surface to which baffle 18 (FIG. 6) is attached.

First and second lenses 50 and 52 are respectively aligned along first and second beam path axes 24 and 26, described above with regard to FIG. 4. Although not shown in FIG. 7, it can be appreciated that intersection 35 (FIG. 4), at which first beam path axis 24 intersects common beam path axis 32, is located on upper surface 44 (FIG. 5) of filter block 40, and intersection 36 (FIG. 4), at which second beam path axis 26 intersects common beam path axis 32, is located on lower surface 46 (FIG. 6) of filter block 40. Note that the portion of first beam path axis 24 between first lens 50 and the cavity in which filter block 40 is mounted consists of the material of body 12 that is transparent to the transmit and receive wavelengths. Similarly, the portion of second beam path axis 26 between second lens 52 and the cavity in which filter block 40 is mounted consists of the material of body 12 that is transparent to the transmit and receive wavelengths. Thus, although not shown in FIG. 7, it can be appreciated that common beam path axis 32 (FIG. 4) intersects upper surface 44 of filter block 40, lower surface 46 of filter block 40, and TIR lens 48.

Figure 8:
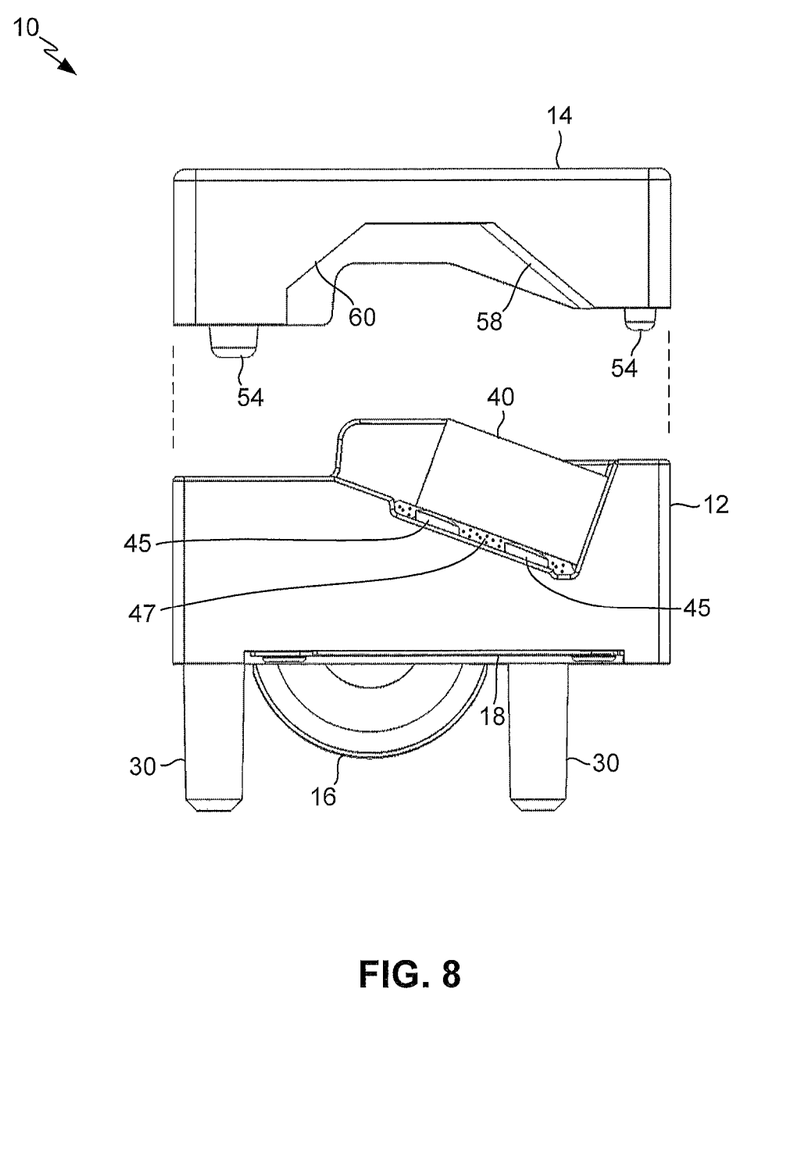
FIG. 8 is rear elevation view of the optics device, with the lid and body disassembled from each other.
Figure 9:
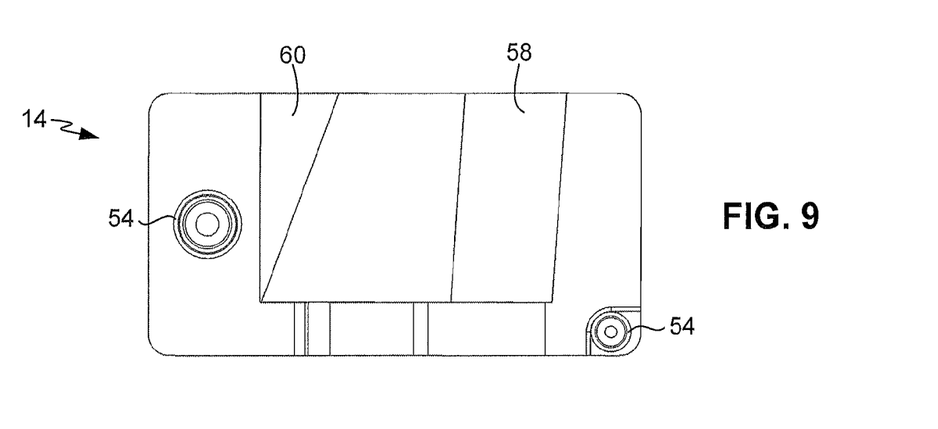
FIG. 9 is a bottom plan view of the lid of FIG. 8.
Figure 10:
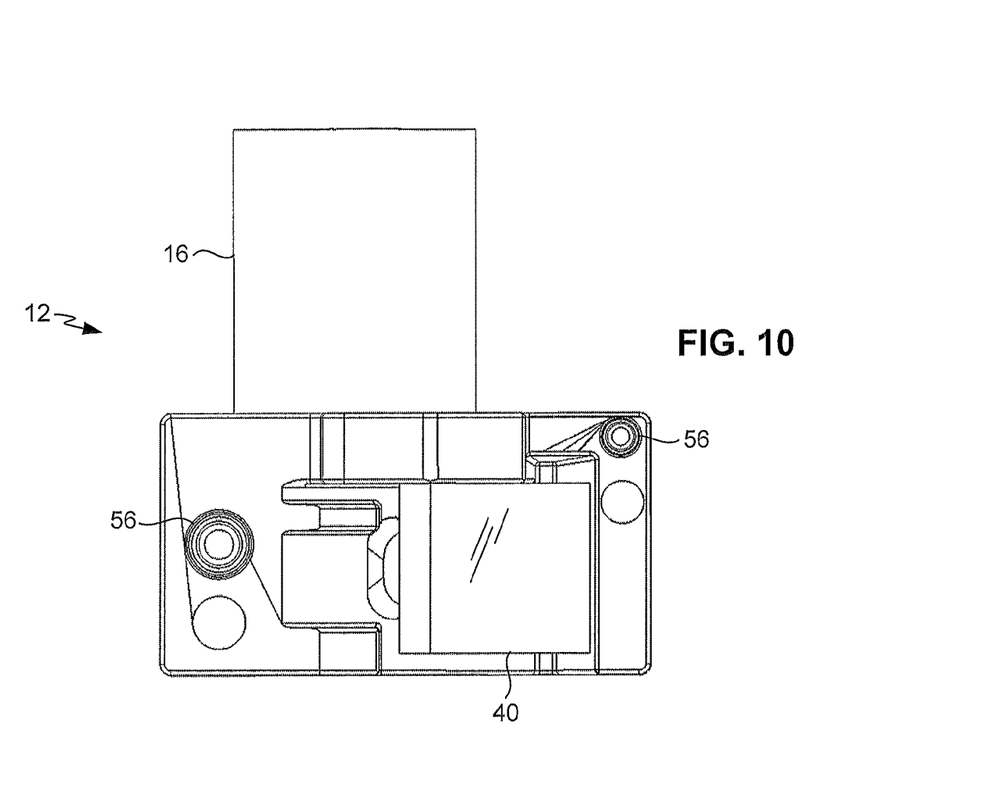
FIG. 10 is a top plan view of the body of FIG. 8.

As illustrated in FIGS. 8-10, a pair of posts 54 (FIGS. 8-9) on a lower portion of lid 14 are received in a pair of correspondingly located bores 56 (FIG. 10) in an upper portion of body 12 to attach lid 14 to body 12. The lower portion of lid 14 includes a recessed region having a first reflective surface 58 and a second reflective surface 60. As described in further detail below with regard to embodiments shown in FIGS. 11A and 11B, a portion of a feedback beam path 62 extends between first reflective surface 58 and second reflective surface 60. Lid 14 can be made economically entirely out of molded white plastic as a single piece (i.e., lid 14 can consist of molded white plastic), as the reflectivity of white plastic is generally sufficient for feedback purposes as described below.

Figure 11A:
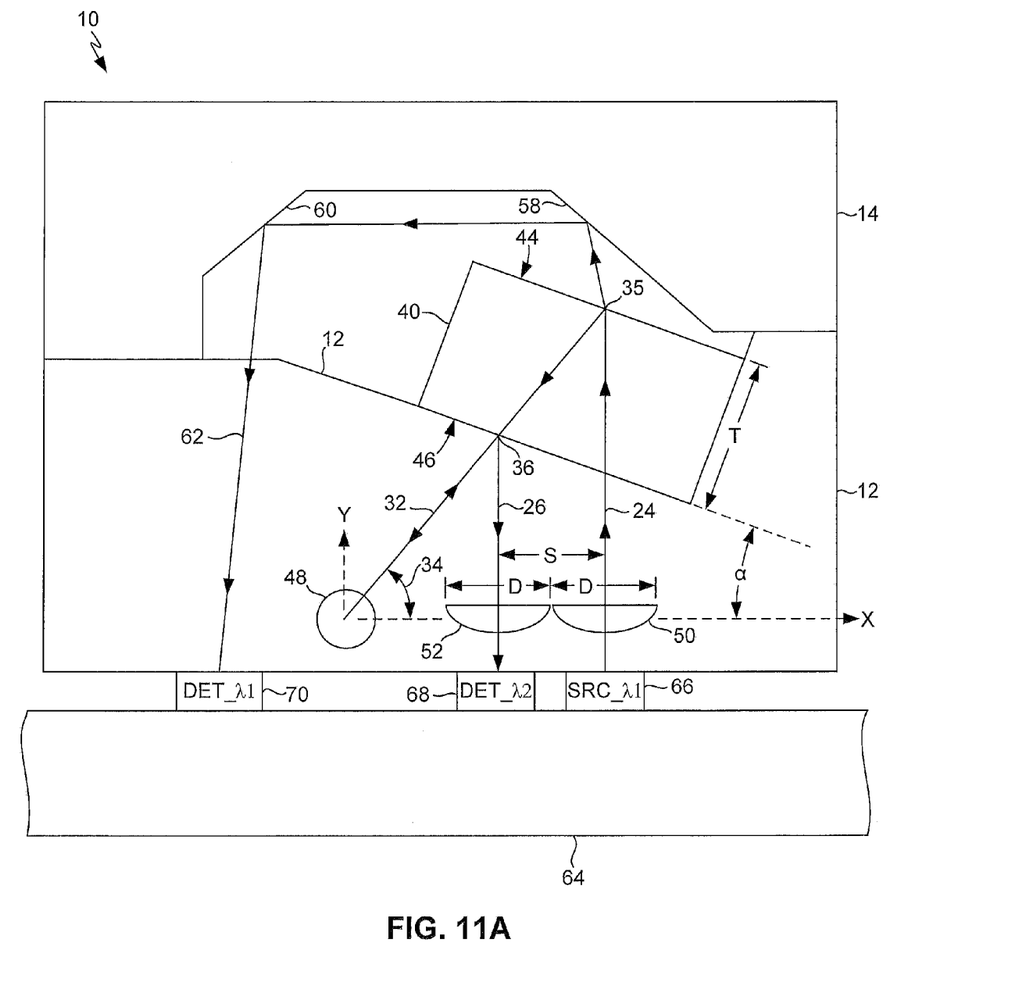
FIG. 11A is an optics diagram showing optical beam paths in relation to optical and opto-electronic elements of the optics device in an embodiment relating to a bidirectional transceiver module.
Figure 11B:
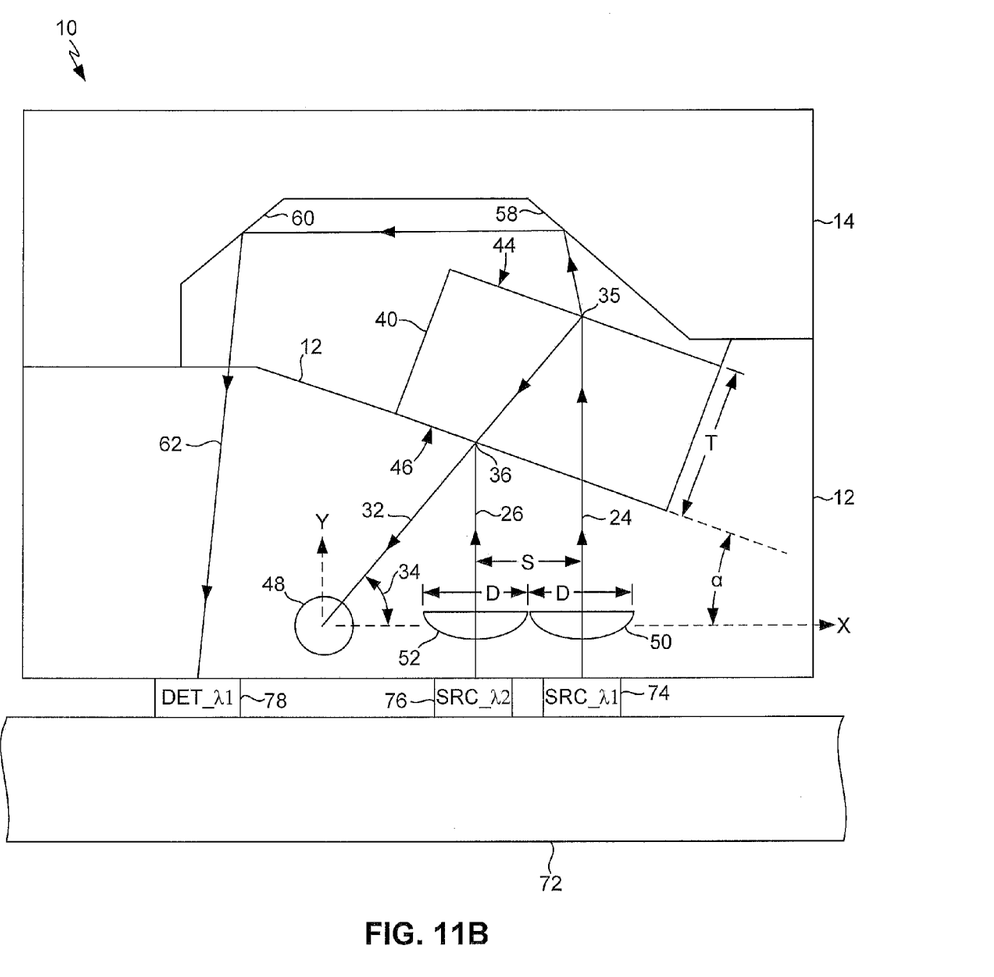
FIG. 11B is an optics diagram showing optical beam paths in relation to optical and opto-electronic elements of the optics device in an embodiment relating to a WDM transmitter module.
Figure 11C:
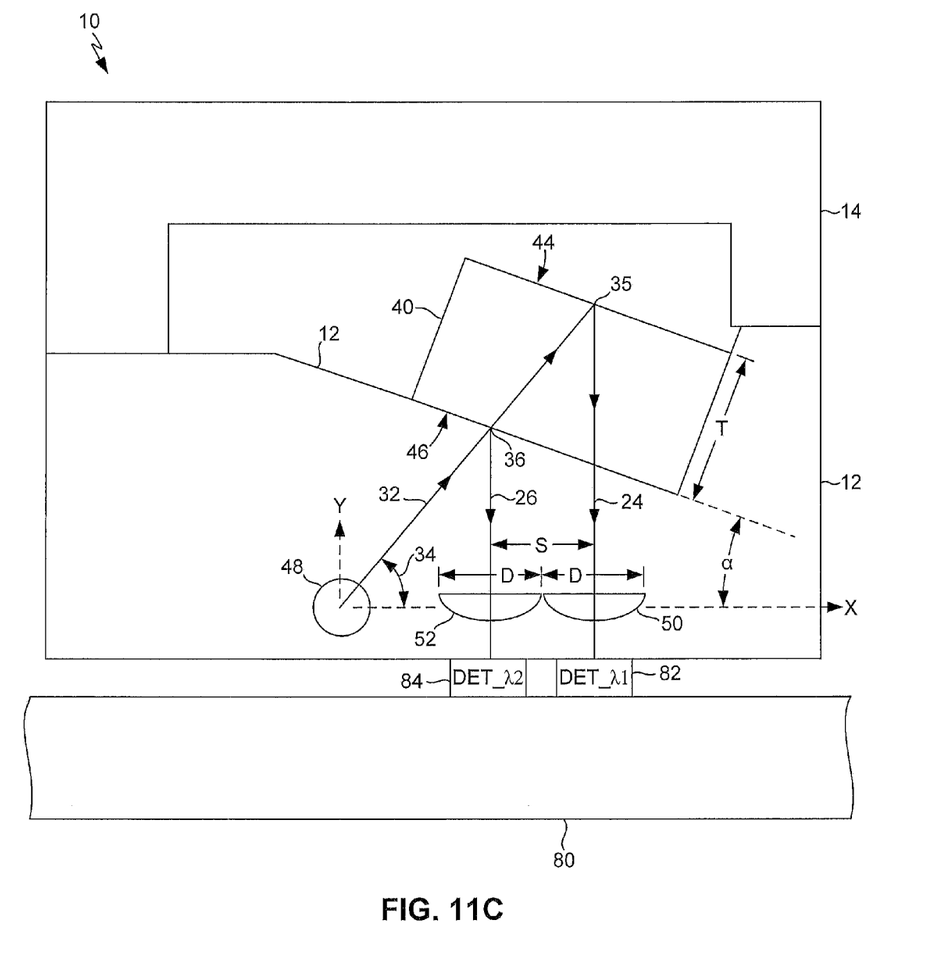
FIG. 11C is an optics diagram showing optical beam paths in relation to optical and opto-electronic elements of the optics device in an embodiment relating to a WDM receiver module.

As illustrated in FIG. 11A, in this exemplary embodiment optics device 10 is mounted on a substrate 64. Substrate 64 can be of any suitable type, such as a molded leadframe or a printed circuit board (PCB). As FIGS. 11A-11C are intended to provide diagrammatic views for purposes of describing the operation of these embodiments, details of the structure are not shown for purposes of clarity.

In the exemplary embodiment illustrated in FIG. 11A, a light source 66, such as a laser, is mounted on the surface of substrate 64 adjacent to first lens 50 and in optical alignment with first beam path axis 24. Light source 66 is configured to emit optical signals of a first wavelength ($\lambda 1$) in response to electrical signals. A main light detector 68, such as PIN photodiode, is mounted on the surface of substrate 64 adjacent to second lens 52 and in optical alignment with second beam path axis 26. Main light detector 68 is configured to detect optical signals of a second wavelength ($\lambda 2$) and, in response, produce corresponding electrical signals. A feedback light detector 70 is similarly mounted on the surface of substrate 64 adjacent to a wall or surface of the lower portion of body 12. Feedback light detector 70 is configured to detect optical signals of the first wavelength (λ1) and, in response, produce corresponding electrical signals. In this embodiment, light source 66, main light detector 68, and feedback light detector 70 can all be mounted along a line parallel to the X axis. Note that first lens 50, second lens 52 and TIR lens 48 are similarly located along a line defined by the X axis.

It can also be noted that since filter block 40 has a thickness (T), the upper and lower surfaces 44 and 46 of filter block 40 are oriented at an angle (α) with respect to the X axis that is selected to provide a distance or separation (S) between first beam path axis 24 and second beam path axis 26. As first and second lenses 50 and 52 occupy some amount of space on the lower portion of body 12, the separation (S) is great enough to accommodate that space. For example, in an embodiment in which transmit and receive lenses 50 and 52 are immediately adjacent one another and have diameters (D), the thickness (T) and the angle (α) of filter block 40 with respect to the X axis can be selected to provide a separation (S) that is D or greater.

In operation, in the embodiment shown in FIG. 11A, an optical signal (i.e., light beam) of the second wavelength can be received through barrel 16 along barrel optical axis 28 (FIGS. 1-4). The TIR lens 48 reflects such a receive (Rx) beam at the angle 34 onto common beam path axis 32. This reflected Rx beam propagates through the transparent material of body 12 and impinges upon lower surface 46 of filter block 40, which reflects the Rx beam onto second beam path axis 26 because in this embodiment lower surface 46 is substantially reflective at the second wavelength. The Rx beam propagates along second beam path axis 26 through the transparent material of body 12, including second lens 52, which focuses the Rx beam. The focused Rx beam impinges upon main light detector 68, which converts the optical signal into a corresponding electrical Rx signal. Main light detector 68 provides the electrical Rx signal to electrical signal conductors (not shown) associated with substrate 64.

Also, in operation, light source 66 can receive an electrical transmit (Tx) signal from other electrical signal conductors (not shown) associated with substrate 64 and convert the electrical Tx signal into a corresponding optical transmit signal (i.e., light beam) of the first wavelength. Light source 66 emits such an optical Tx beam along first beam path axis 24, through first lens 50, which focuses the Tx beam. The Tx beam continues to propagate along transmit beam path axis 24 through the transparent material of body 12 and impinges upon lower surface 46 of filter block 40. Lower surface 46 does not reflect the Tx beam because in this embodiment lower surface 46 is substantially transmissive at the transmit wavelength. Rather, the Tx beam passes into filter block 40 along first beam path axis 24 and impinges upon upper surface 44 of filter block 40. Upper surface 44 reflects a portion of the optical energy of the Tx beam onto common beam path axis 32 because in this embodiment upper surface 44 is partially reflective at the transmit wavelength. This reflected portion of the Tx beam impinges upon and is transmitted through lower surface 46. This portion of the Tx beam continues to propagate along common beam path axis 32 through the transparent material of body 12 and impinges upon TIR lens 48, which reflects it into barrel 16 along barrel optical axis 28 (FIGS. 1-4).

Because in this embodiment upper surface 44 of filter block 40 is only partially reflective at the transmit wavelength and not completely (100 percent) reflective, another portion of the optical energy (such as, for example, about 10 percent or less) of the Tx beam is transmitted through upper surface 44 and is used as a feedback beam in a feedback control loop for measuring transmit power. This feedback beam impinges upon first reflective surface 58, which reflects it along a portion of feedback beam path 62 toward second reflective surface 60. Second reflective surface 60 further reflects this feedback beam along another portion of feedback beam path 62 into the transparent material of body 12. The feedback beam propagates through this portion of body 12 and is emitted from body 12 at a feedback beam exit region 71 (FIGS. 2, 6 and 7) on a lower portion of body 12. As feedback light detector 70 is located adjacent feedback beam exit region 71 and is optically aligned along the corresponding portion of feedback beam path 62, the feedback beam impinges upon feedback light detector 70. Feedback light detector 70 converts this feedback optical signal into a feedback electrical signal and provides the feedback electrical signal to corresponding conductors (not shown) associated with substrate 64.

To adequately gauge the transmit power, the feedback beam need be no greater than a small percentage of the Tx beam. Thus, the white plastic material of which lid 14 consists in this exemplary embodiment need not be completely (100 percent) reflective. Economical white plastic is commonly about 80-90 percent reflective. For these reasons, white plastic is a suitable material.

Note that TIR lens 48 is located between feedback beam exit region 71 and receive lens 52. Stated another way, feedback beam path 62 is generally "U"-shaped, such that feedback beam exit region 71 is located on the opposite end of the "U" from the end at which transmit and receive lenses 50 and 52 are located, and TIR lens 48 is located between the ends of the "U." This U-shaped arrangement helps economize space within optics device 10.

As illustrated in FIG. 11B, in another exemplary embodiment optics device 10 is mounted on a substrate 72 that can be similar to substrate 64 in the embodiment described above with regard to FIG. 11A. In this embodiment, a first light source 74, such as a laser, is mounted on the surface of substrate 72 adjacent to first lens 50 and in optical alignment with first beam path axis 24. First light source 74 is configured to emit optical signals of a first wavelength (λ1) in response to electrical signals. A second light source 76 is mounted on the surface of substrate 72 adjacent to second lens 52 and in optical alignment with second beam path axis 26. Second light source 76 is configured to emit optical signals of a second wavelength (λ2) in response to electrical signals. A feedback light detector 78 is similarly mounted on the surface of substrate 72 adjacent to a wall or surface of the lower portion of body 12. Feedback light detector 78 is configured to detect optical signals of the first wavelength (2d) and, in response, produce corresponding electrical signals. In this embodiment, first light source 74, second light source 76, and feedback light detector 78 can all be mounted along a line parallel to the X axis.

In operation, in the embodiment shown in FIG. 11B, first light source 74 can receive a first electrical transmit (Tx_1) signal from other electrical signal conductors (not shown) associated with substrate 72 and convert the electrical Tx_1 signal into a corresponding optical transmit signal (i.e., light beam) of the first wavelength. First light source 74 emits such an optical Tx_1 beam along first beam path axis 24, through first lens 50, which focuses the Tx_1 beam. The Tx_1 beam continues to propagate along first beam path axis 24 through the transparent material of body 12 and impinges upon lower surface 46 of filter block 40. Lower surface 46 does not reflect the Tx_1 beam because in this embodiment lower surface 46 is substantially transmissive at the transmit wavelength. Rather, the Tx_1 beam passes into filter block 40 along first beam path axis 24 and impinges upon upper surface 44 of filter block 40. Upper surface 44 reflects a portion of the optical energy of the Tx_1 beam onto common beam path axis 32 because in this embodiment upper surface 44 is partially reflective at the transmit wavelength. This reflected portion of the Tx_1 beam impinges upon and is transmitted through lower surface 46. This portion of the Tx_1 beam continues to propagate along common beam path axis 32 through the transparent material of body 12 and impinges upon TIR lens 48, which reflects and focuses the beam into barrel 16 along barrel optical axis 28 (FIGS. 1-4).

As in the embodiment described above with regard to FIG. 11A, a portion of the optical energy of the Tx_1 beam is transmitted through upper surface 44 and is used as a feedback beam in a feedback control loop for measuring transmit power. As in the embodiment described above with regard to FIG. 11A, the feedback beam is reflected by first and second reflective surfaces 58 and 60 of lid 14. The feedback beam impinges upon feedback light detector 78, which converts the feedback optical signal into a feedback electrical signal and provides the feedback electrical signal to corresponding conductors (not shown) associated with substrate 72.

In addition, in this embodiment second light source 76 similarly can receive a second electrical transmit (Tx_2) signal from other electrical signal conductors (not shown) associated with substrate 72 and convert the electrical Tx_2 signal into a corresponding optical transmit signal (i.e., light beam) of the second wavelength. Second light source 76 emits such an optical Tx_2 beam along second beam path axis 26, through second lens 52, which focuses the Tx_2 beam. The Tx_2 beam continues to propagate along second beam path axis 26 through the transparent material of body 12 and impinges upon lower surface 46 of filter block 40. Lower surface 46 reflects the Tx_2 beam because in this embodiment lower surface 46 is substantially reflective at the second transmit wavelength. This reflected Tx_2 beam continues to propagate along common beam path axis 32 through the transparent material of body 12 and impinges upon TIR lens 48, which reflects it into barrel 16 along barrel optical axis 28 (FIGS. 1-4).

As illustrated in FIG. 11C, in still another exemplary embodiment optics device 10 is mounted on a substrate 80 that can be similar to substrates 64 and 72 in the embodiments described above with regard to FIGS. 11A and 11B. In this embodiment, a first light detector 82, such as PIN photodiode, is mounted on the surface of substrate 80 adjacent to first lens 50 and in optical alignment with first beam path axis 24. First light detector 82 is configured to detect optical signals of a first wavelength ($\lambda 1$) and, in response, produce corresponding electrical signals. In addition, a second light detector 84, such as PIN photodiode, is mounted on the surface of substrate 80 adjacent to second lens 52 and in optical alignment with second beam path axis 26. Second light detector 84 is configured to detect optical signals of a second wavelength ($\lambda 2$) and, in response, produce corresponding electrical signals.

In operation, in the embodiment shown in FIG. 11C, a first optical signal (i.e., light beam) of the first wavelength can be received through barrel 16 along barrel optical axis 28 (FIGS. 1-4). The TIR lens 48 reflects such a first receive (Rx_1) beam at the angle 34 onto common beam path axis 32. This reflected Rx_1 beam propagates through the transparent material of body 12 and passes through lower surface 46 of filter block 40 along common beam path axis 32 because in this embodiment lower surface 46 is substantially transmissive at the first wavelength. This Rx_1 beam propagates through filter block 40 along common beam path axis 32 and impinges upon upper surface 44 of filter block 40. Upper surface 44 reflects the optical energy of the Rx_1 beam onto first beam path axis 24 because in this embodiment upper surface 44 is substantially reflective at the first transmit wavelength. This reflected Rx_1 beam propagates back through filter block 40 along first beam path axis 24 and is transmitted through lower surface 46. The Rx_1 beam continues to propagate along first beam path axis 24 through the transparent material of body 12, including first lens 50, which focuses the Rx_1 beam. The focused Rx_1 beam impinges upon first light detector 82, which converts the optical signal into a corresponding electrical Rx_1 signal. First light detector 82 provides the electrical Rx_1 signal to electrical signal conductors (not shown) associated with substrate 80.

In addition, in this embodiment a second optical signal (i.e., light beam) of the second wavelength can be received through barrel 16 along barrel optical axis 28 (FIGS. 1-4). The TIR lens 48 reflects such a second receive (Rx_2) beam at the angle 34 onto common beam path axis 32. This reflected Rx_2 beam propagates through the transparent material of body 12 and impinges upon lower surface 46 of filter block 40, which reflects the Rx_2 beam onto second beam path axis 26 because lower surface 46 is substantially reflective at the second wavelength. The Rx_2 beam propagates along second beam path axis 26 through the transparent material of body 12, including second lens 52, which focuses the Rx_2 beam. The focused Rx_2 beam impinges upon second light detector 84, which converts the optical signal into a corresponding electrical Rx_2 signal. Second light detector 84 provides the electrical Rx_2 signal to electrical signal conductors (not shown) associated with substrate 80.

Figure 12:
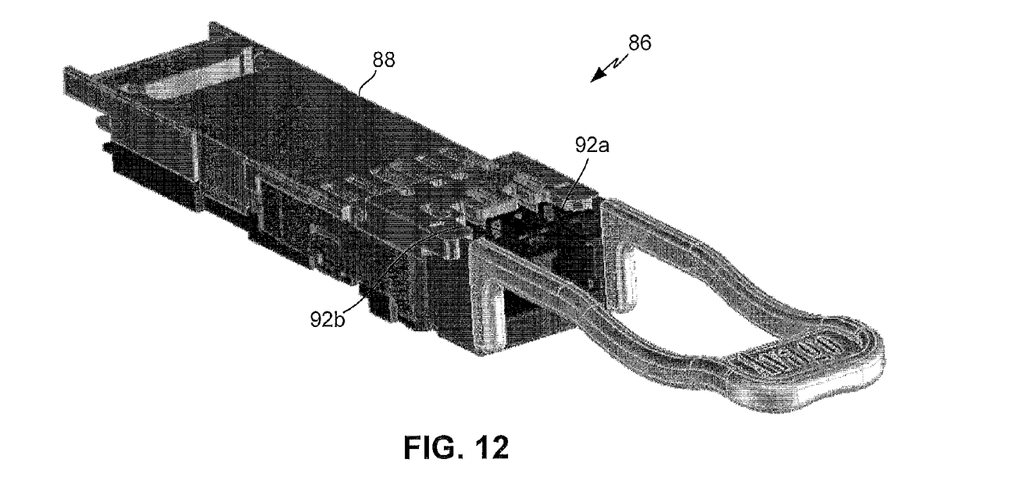
FIG. 12 is a perspective view of a bidirectional optical transceiver module that includes the optics device.
Figure 13:
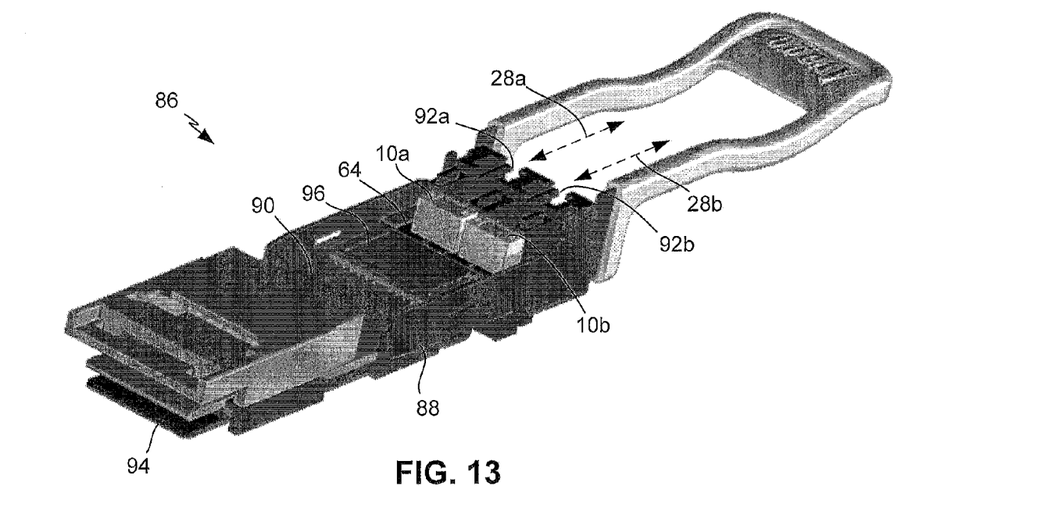
FIG. 13 is a perspective view of the bidirectional optical transceiver module of FIG. 12, with a portion of the module housing removed to show two of the optics devices mounted within the module housing.

As illustrated in FIGS. 12-13, in an exemplary embodiment an optical transceiver module 86 includes two of optics devices 10a and 10b, each of which can be identical to above-described optics device 10. Each of optics devices 10a and 10b is mounted at a forward end of a module housing 88 in the manner described above with regard to FIGS. 11A-11C. Features of the mounting arrangement described above with regard to FIG. 11A-11C that are not shown in FIGS. 12-13 for purposes of clarity include the mounted opto-electronic devices (e.g., light source 66, main light detector 68, and feedback light detector 70). For example, leadframe 64, on which light source 66, main light detector 68, and feedback light detector 70 are mounted as described above with regard to FIG. 11A can, in turn, be mounted on a PCB 90 in a conventional manner. The PCB 90 has an elongated shape and extends between the forward and rearward ends of module housing 88.

It can be noted that optical transceiver module 86 has a form that is generally characteristic of SFP, QSFP, CXP, CFP, etc., configurations: an elongated, rectangular housing shape; one or more optical receptacles 92a and 92b at the forward end that are configured to mate with an LC plug or similar optical connector (not shown); and one or more electrical contact pad arrays 94 at the rearward end that are configured to mate with a connector in an enclosure into which optical transceiver module 86 is plugged. Optics devices 10a and 10b have corresponding barrel optical axes 28a and 28b, each of which is the same as above-described barrel optical axis 28. Although not shown for purposes of clarity, when an LC plug or similar connector of an optical fiber cable is mated with one of receptacles 92a and 92b, the optical axis of the fiber end retained in the connector is aligned with the corresponding barrel optical axis 28a and 28b. Accordingly, during operation, the above-described Tx and Rx beams are communicated through such a fiber. (In some embodiments, a fiber stub (not shown) can be attached in a conventional manner to barrel 16 of body 12 as an intermediary element.) As the general structure and operation of conventional QSFP, SFP, CXP, CFP, etc., optical transceivers are well understood in the art, such conventional aspects of optical transceiver module 86 are not described herein for brevity. However, aspects of optical transceiver module 86 that are not conventional and thus should be noted include, for example, the compact size of optics devices 10a and 10b in relation to module housing 88 and their positions within module housing 88.

More specifically, the compact size of optics devices 10a and 10b helps economize space within a module housing 88 having a conventional size and shape as defined in the corresponding housing specification. Also, note that the region within module housing 88 just rearward of optics devices 10a and 10b is occupied by an integrated circuit chip 96 mounted on PCB 90. Such an integrated circuit chip 96 can include driver circuitry for generating the above-described electrical Tx signals, receiver circuitry for processing the above-described electrical Rx signals, and feedback circuitry for processing the above-described feedback electrical signals. The compact size of optics devices 10a and 10b helps maximize the area on leadframe 64 that can be occupied by such circuitry. In addition, and significantly, the compact size of optics devices 10a and 10b enables such circuitry to be located in close proximity to the opto-electronic devices (e.g., above-described light source 66, main light detector 68, etc.) and thereby minimize the length of signal traces on PCB 74 that interconnect the circuitry and the opto-electronic devices. Minimizing the length of such interconnecting signal traces promotes signal integrity, which in turn promotes high bit rates.

The small size of optics device 10 helps significantly reduce attenuation loss because of the much shorter optical path length in plastic, often from reducing loss from 7 db to under 1 db loss, which is significant with a high speed laser producing much less light. The optical loss of conventional design is often not tolerable. The shorter optical path length in the above-described embodiments than in conventional designs greatly improves tolerances, and the angles of the surfaces are much less critical than in longer conventional designs resulting in a large yield improvement.

Several structural features promote the compact size of optics device 10, including, for example, that optics device 10 includes no more than a single filter block 40 or other such wavelength-selective element, and the above-described geometric relationships among the optical elements.

One or more illustrative embodiments of the invention have been described above. However, it is to be understood that the invention is defined by the appended claims and is not limited to the specific embodiments described.

What is claimed is:

1. An optical communications module, comprising:
a housing assembly;
a first opto-electronic device mounted in the housing assembly at a first position having a first X-axis coordinate with respect to a frame of reference having mutually perpendicular X, Y and Z axes;
a second opto-electronic device mounted in the housing assembly at a second position having a second X-axis coordinate; and
a optics device mounted in the housing assembly, the optics device comprising a barrel coupleable to an optical fiber, the barrel having a barrel optical axis defined by the Z axis, the optics device further comprising a Total Internal Reflection (TIR) lens aligned with the barrel optical axis and configured to reflect optical signals between the barrel optical axis and a common beam path axis oriented in a direction having an X-axis component offset by a non-zero amount from the barrel optical axis and a Y-axis component offset by a non-zero amount from the barrel optical axis, the common beam path axis intersecting a first reflective interface of the optics device and a second reflective interface of the optics device, the first opto-electronic device optically aligned along a first beam path axis intersecting the first reflective interface and the common beam path axis, the second opto-electronic device optically aligned along a second beam path axis intersecting the second reflective interface and the common beam path axis.

2. The optical communications module of claim 1, wherein the first opto-electronic device is a light source configured to emit a first signal wavelength, and the second opto-electronic device is a light detector configured to detect a second signal wavelength.

3. The optical communications module of claim 2, wherein the optics device includes a filter block, a first surface of the filter block defines the first reflective interface, and a second surface of the filter block parallel to the first surface defines the second reflective interface.

4. The optical communications module of claim 3, wherein the first and second surfaces of the filter block are oriented at a non-zero angle to the X axis.

5. The optical communications module of claim 3, wherein:
the first surface of the filter block is at least partially reflective to the first signal wavelength; and
the second surface of the filter block is substantially reflective to the second signal wavelength and at least partially transmissive to the first signal wavelength.

6. The optical communications module of claim 3, wherein the filter block is the sole wavelength-selective element of the optical communications module.

7. The optical communications module of claim 1, further comprising a feedback detector aligned with a feedback beam path, wherein the first opto-electronic device is a light source configured to emit a first signal wavelength, the first reflective interface is partially transmissive and partially reflective to the first signal wavelength, and the optics device further comprises a first feedback path reflector and a second feedback path reflector, and wherein the first feedback path reflector, the second feedback path reflector, and an intersection of the first beam path axis with the first reflective interface are disposed along the feedback beam path.

8. The optical communications module of claim 7, wherein the feedback beam path intersects a feedback beam exit location on a surface of the optics device, and the TIR lens is disposed between the feedback beam exit location and the receive lens.

9. The optical communications module of claim 7, wherein the first feedback path reflector and the second feedback path reflector are defined by surfaces of a lid of the optics device, and the lid is attached to a body of the optics device.

10. The bidirectional optical communications module of claim 9, wherein the surfaces of the lid are white.

11. The optical communications module of claim 10, wherein the lid consists of white plastic.

12. The optical communications module of claim 1, wherein the optics device comprises a first lens optically aligned along the first beam path axis and adjacent the first opto-electronic device and a second lens optically aligned along the second beam path axis and adjacent the second opto-electronic device.

13. The optical communications module of claim 12, wherein the first beam path axis and second beam path axis are parallel to each other.

14. The optical communications module of claim 13, wherein the first lens and the second lens each have a diameter and are disposed adjacent each other, the first and second surfaces of the filter block are oriented at a non-zero angle to the X axis, and the non-zero angle is selected to define a separation between the first beam path axis and the second beam path axis substantially equal to the diameter.

15. The optical communications module of claim 1, wherein the first opto-electronic device is a first light source configured to emit a first signal wavelength, and the second opto-electronic device is a second light source configured to emit a second signal wavelength.

16. The optical communications module of claim 15, wherein:
the optics device includes a filter block, a first surface of the filter block defines the first reflective interface, and a second surface of the filter block parallel to the first surface defines the second reflective interface;
the first surface of the filter block is at least partially reflective to the first signal wavelength; and
the second surface of the filter block is substantially transmissive to the first signal wavelength and substantially reflective to the second signal wavelength.

17. The optical communications module of claim 15, wherein:
the optics device includes a filter block, a first surface of the filter block defines the first reflective interface, and a second surface of the filter block parallel to the first surface defines the second reflective interface;
the first surface of the filter block is at least partially reflective to the first signal wavelength; and
the second surface of the filter block is substantially transmissive to the first signal wavelength and substantially reflective to the second signal wavelength.

18. The optical communications module of claim 1, wherein the first opto-electronic device is a first light detector configured to detect a first signal wavelength, and the second opto-electronic device is a second light detector configured to detect a second signal wavelength.

19. A method of operation in an optical communications module, the optical communications module comprising a housing assembly, a first opto-electronic device mounted in the housing assembly at a first position having a first X-axis coordinate with respect to a frame of reference having mutually perpendicular X, Y and Z axes, a second opto-electronic device mounted in the housing assembly at a second position having a second X-axis coordinate, and an optics device mounted in the housing assembly, the optics device comprising a barrel coupleable to an optical fiber, the barrel having a barrel optical axis defined by the Z axis, the method of operation comprising:

a Total Internal Reflection (TIR) lens aligned with the barrel optical axis reflecting first and second optical signals between the barrel optical axis and a common beam path axis oriented in a direction having an X-axis component offset by a non-zero amount from the barrel optical axis and a Y-axis component offset by a non-zero amount from the barrel optical axis, the common beam path axis intersecting a first reflective interface of the optics device and a second reflective interface of the optics device;
the first reflective surface reflecting the first optical signal between the common beam path axis and a first beam path axis intersecting the first reflective interface;
the second reflective surface reflecting the second optical signal between the common beam path and a second beam path axis intersecting the second reflective interface and the common beam path axis;
propagating the first optical signal along the first beam path axis between the first reflective interface and a first opto-electronic device; and
propagating the second optical signal along a second beam path axis between the second reflective interface and a second opto-electronic device.

20. The method of claim 19, wherein:
propagating the first optical signal along the first beam path axis comprises propagating an optical transmit signal having a first wavelength from a light source through the second reflective interface to the first reflective interface; and
propagating the second optical signal along the second beam path axis comprises propagating an optical receive signal having a second wavelength from the second reflective interface to a light detector.

21. The method of claim 19, wherein:
propagating the first optical signal along the first beam path axis comprises propagating a first optical transmit signal having a first wavelength from a first light source through the second reflective interface to the first reflective interface; and
propagating the second optical signal along the second beam path axis comprises propagating a second optical transmit signal having a second wavelength from a second light source to the second reflective interface.

22. The method of claim 19, wherein:
propagating the first optical signal along the first beam path axis comprises propagating a first optical receive signal having a first wavelength from the first reflective interface through the second reflective interface to a first light detector; and
propagating the second optical signal along the second beam path axis comprises propagating a second optical receive signal having a second wavelength from the second reflective interface to a second light detector.

* * * * *